United States Patent [19]

Wagner

[11] 4,337,952
[45] Jul. 6, 1982

[54] HERMETIC SEALING APPARATUS FOR A ROTATING SHAFT

[76] Inventor: Ernest E. Wagner, P.O. Box 264, Yountville, Calif. 94599

[21] Appl. No.: 844,722

[22] Filed: Oct. 25, 1977

[51] Int. Cl.³ .............................................. F16L 27/10
[52] U.S. Cl. ...................................... 277/30; 277/234; 74/18.1
[58] Field of Search ................... 403/288; 74/18.1; 277/233, 234, 235 R, 88, 89, 1, 30

[56] References Cited

U.S. PATENT DOCUMENTS

| | | | |
|---|---|---|---|
| 664,479 | 12/1900 | Hughson | 285/DIG. 11 |
| 2,620,208 | 12/1952 | Patch et al. | 277/30 |
| 2,978,914 | 4/1961 | Gut | 74/18.1 |
| 3,190,680 | 6/1965 | Maly | 285/DIG. 11 |
| 3,449,965 | 6/1969 | Ross | 74/18.1 |
| 3,734,567 | 5/1973 | Herbert | 277/30 |
| 4,111,435 | 9/1978 | Vilain | 277/9 |

Primary Examiner—Robert I. Smith
Attorney, Agent, or Firm—Gausewitz, Carr, Rothenberg & Edwards

[57] ABSTRACT

This invention relates to an apparatus effecting a drive through the wall of a pressure vessel comprising a stationary housing containing a rotating drive shaft, a motion transmitting member, a driven shaft and a flexible member attached to both the motion transmitting member and the stationary housing to hermetically seal and prevent transfer of fluid in or out.

5 Claims, 8 Drawing Figures

HERMETIC SEALING APPARATUS FOR A ROTATING SHAFT

The new and novel feature of this invention, distinguishing it from prior art, is the elimination of pressure sensitive flexible bellows, diaphrams or membranes and the substitution of a rugged flexible sandwich, permitting operation at pressures far greater than now attainable, including the necessary modification of the motion transmitting member.

Furthermore where dangerous materials are involved or living space may become hazardous to health and life in case of a sudden seal failure, for example deep ocean exploration, means are provided to prevent undue flooding and maintain leakage within acceptable limits until relief can be obtained; also, provisions for the use of telltales to continuously monitor the condition of the seal are part of this specification as will be clearly demonstrated in the description in conjunction with the drawings.

Figure 1:
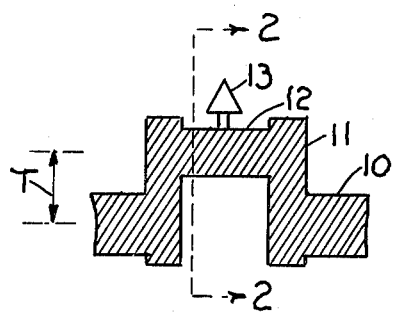
FIG. 1 is a schematic representation of a rigid link in a crank type motion transmitting member.
Figure 2:
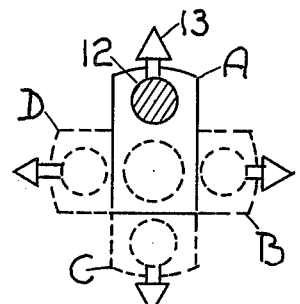
FIG. 2 is a cross-sectional view taken on line 2—2 of FIG. 1.

In the drawings, FIGS. 1 through 4 illustrate the action of a rotating crankpin versus a non-rotating but revolving crankpin. In FIG. 1, T represents the throw of the crankshaft, 10 represents that portion of the crankshaft journalled in stationary bearings, 11 the cheeks and 12 the crankpin. Fixed to the surface of the crankpin is an arrow 13. As the crankshaft rotates, the four 90° positions—shown in FIG. 2—clearly indicate that the crankpin, by definition, likewise rotates. Any fixed point on the crankpin as indicated by the arrow in position "A" also changes its direction, see positions "B, C and D". The arrow represents any object, rigid or flexible, fixedly attached to the crankpin. An attempt to keep the position of "A" pointing north, such as coupling it to a stationary housing, will stall the crankshaft or shear off the arrow.

In FIG. 3, T again represents the throw of the crankshaft, 14 the journal portion, 15 the cheeks, 16 bearing assemblies and 17 the crankpin carried in bearings 16. Crankpin 17 is free to rotate independently of any crankshaft rotation. Consequently the direction of arrow 18 may, by suitable means, be held pointing north irrespective of rotation of the crankshaft as indicated by the four 90° positions in FIG. 4. The crankpin no longer rotates but, by definition, revolves around the centerline of the crankshaft. The crankpin's motion is a circular translation without rotation with respect to a coordinate system such as its housing.

Figure 5:
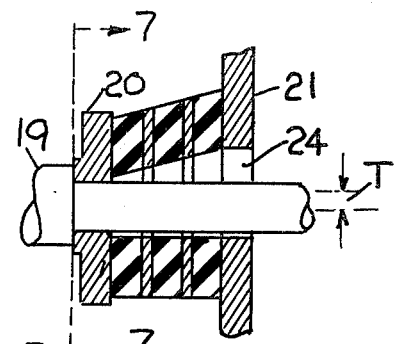
FIG. 5 is a longitudinal cross-sectional view through the crankpin and flexible sandwich in position "G" of FIG. 4.
Figure 3:
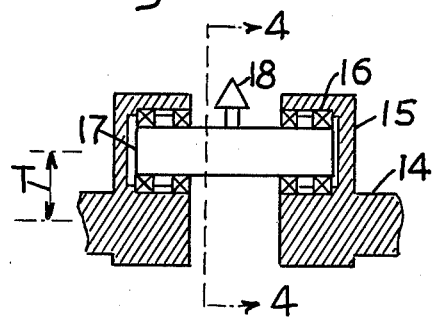
FIG. 3 represents the linkage of FIGS. 1-2 modified in accordance with the requirements of this invention.
Figure 4:
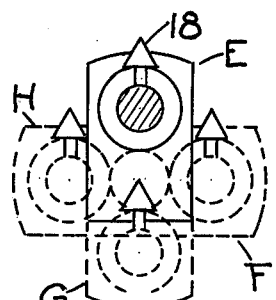
FIG. 4 is a cross-sectional view taken on line 4—4 of FIG. 3.
Figure 6:
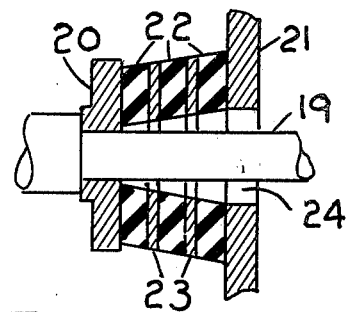
FIG. 6 is a longitudinal cross-sectional view through the crankpin and flexible sandwich in positions "F" and "H" of FIG. 4.
Figure 7:
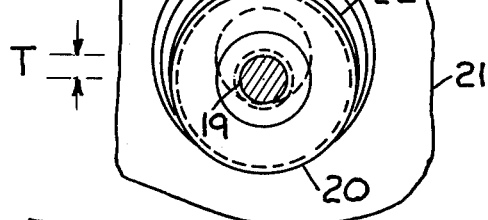
FIG. 7 is a fragmentary view on line 7—7 of FIG. 5 showing the flexible sandwich in assembly with the crankpin in position "G" of FIG. 4.

In the drawings, FIGS. 5, 6 and 7 represent an assmebled sandwich wherein 19 is the motion transmitting member, simply termed a crankpin, 20 the moving endplate with circular translation, 21 the stationary endplate incorporated in a stationary housing, 22 are flexible annular rings of elastomeric material such as "Neoprene" and 23 rigid annular rings.

The purposes and function of the sandwich is threefold, reduce the stress of the bond between flexible materials and endplates, increase deflection and hermetically seal and fluid within the cavity 24.

For best performance flexible materials used for the purpose of the present application should be stressed in shear. It is readily apparent that radial movement of plate 20 parallel to plate 21 stresses the flexible material in shear.

Fluid pressure enters the cavity 24 and exerts a uniform radial pressure upon the members 22 and 23. The rigid rings 23 readily absorb the stress and as the force is uniform in all radial directions exert no force upon the structure. The rings practically float and need only be made thick enough to withstand mechanical handling. The flexible rings 22 are proportioned to meet the required deflection and thin enough so that the stress due to the internal fluid does not exceed the bonding strength in shear between its two end surfaces and adjacent rigid materials. Should one ring not have sufficient deflection additional rings may be added thus forming a flexible sandwich adding deflection without adding stress, a most important feature.

Figure 8:
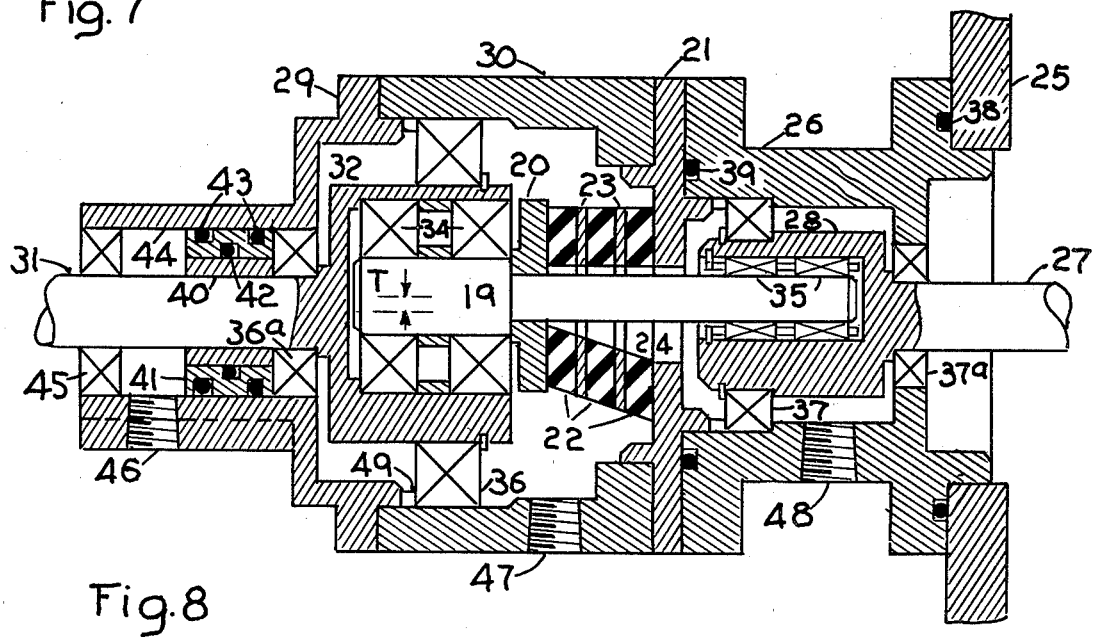
FIG. 8 is a longitudinal cross-section on the centerline of an assembled unit in position "E" of FIG. 4 and embodying the invention.

FIG. 8 is a schematic of an assembly embodying the various devices required to make a fail safe hermetic seal for high pressure. 25 represents the wall of a pressure vessel. The right-hand side of the wall is under pressure, the left-hand side is under ambient conditions. Housing 26 supports the driven shaft 27. The crankcheek 15 of FIG. 3 has here been developed into a cylindrical form 28 concentric with the output shaft 27. The stationary endplate 27 is shown complete in the housing. Cover 29 and housing 30 support drive shaft 31 and crankcheek 32 is modified into a cylindrical form concentric with the input shaft 31, replacing cheek 15 of FIG. 3.

Crankpin 19 is offset from the common centerline by an amount T, and is carried in a pair of bearings 34 at the input end 32 and a pair of bearings 35 at the output end 28. Between is mounted the sandwich assembly of FIGS. 5 and 6 in position "E" of FIG. 4. Drive shaft 31 is carried by a pair of bearings 36 and the driven shaft 27 is journalled in a pair of bearings 37. Pairs of antifriction bearings are required in each position throughout to carry the combination heavy thrust, torque and moment loads generated by the pressure. "O" rings 38 and 39 hermetically seal the fluid from escaping the pressure vessel 25 via housing 26. Endplate 20 is pressed, welded or sealed to the crankpin 19. Bonding the flexible members 22 to endplates 20, 21 and the rings 23 effectively seals fluid from escaping into the housing 30 via the cavity 24.

A light compressive loading of the flexible sandwich is desirable and readily applied by adjusting the thickness of spacer 49.

Concentric sleeves 40-41 and "O" rings 42-43 form a viscosity seal to prevent unrestricted escape of fluid from housing 30 should leakage develop or sudden rupture of the sandwich 20-21-22-23 occur. Sleeve 40 rides on shaft 31 with a minute clearance which combined with length and the viscosity of the fluid, liquid or gaseous, effectively reduces any seepage to a minimum amount. In addition hydrodynamic action between the rotating shaft 31 and stationary sleeve 40 generates a film of fluid which effectively prevents contact between the two, consequently wear as well. Runout of the bearings and unavoidable machining variations prevent an absolutely true geometric structure. Some slight runout and wobble is always present. To prevent rupture of the oil film between shaft 31 and sleeve 40, causing metallic contact between the two, there is a greater clearance between sleeve 40 and 41 then between sleeve 40 and shaft 31. To seal this further clearance an "O" ring 42 or other suitable seal is provided against which sleeve 40 is free to work radially and teeter while sealed against leakage. The outer sleeve 41 is a close fit in bore 44 and sealed by "O" ring 43. A further commercial seal 45 and pipe tap 46 is arranged to divert any final seepage to suitable means of disposal should it prove desirable.

Pipe taps 47 and 48 are provided to allow leakage telltale instrumentation and disposal systems to be connected which however are not a part of this specification.

It will be understood that the invention is not to be limited to the specific construction or arrangement of parts shown, but that the structure may be modified within the scope of the invention.

What is claimed is:

1. Means for transmitting rotary motion through an opening in the wall of a vessel to a driven shaft having a first end portion and a second end portion, at least the first end portion being within said vessel, said means comprising:
   means for rotatably mounting said shaft for rotation about an axis extending through said opening,
   a drive shaft positioned outside said vessel having an adjacent end portion near said opening and another end portion remote therefrom,
   means for rotatably mounting said drive shaft in axial alignment with said driven shift and with said adjacent end portion spaced apart from said second end portion of said driven shaft,
   an elongated motion transmitting member having an outer end portion and an inner end portion, and a mid portion therebetween,
   a first bearing means fixedly attached to said adjacent end portion of said drive shaft for rotation therewith,
   a second bearing means fixedly attached to said second end portion of said driven shaft for rotation therewith,
   said first and second bearing means being adapted to receive and rotatably support said outer and inner end portions, respectively, of said motion transmitting member and maintain said member so that its axis is parallel to the axes of said drive shaft and said driven shaft and offset therefrom, such that when said drive shaft rotates, said motion transmitting member is moved with said first bearing means and transmits a corresponding rotation to said driven shaft,
   the axis of said motion transmitting member revolving translationally about the axes of said drive shaft and said driven shaft and remaining parallel thereto without any rotation of said member relative to its own axis,
   an elongated flexible sealing member surrounding the mid portion of said motion transmitting member,
   means for sealing one end of said elongated flexible sealing member about said opening in the wall of said vessel, and
   means for sealing the other end of said elongated flexible sealing member about said mid portion adjacent said outer end portion of the motion transmitting member.

2. The invention recited in claim 1 wherein said second end portion of said driven shaft extends out of said opening in said vessel and said means for rotatably mounting said shaft includes a stationary housing mounted about said opening, said one end of said elongated flexible member being sealingly affixed to said housing.

3. The invention recited in claim 2 further comprising flange means extending radially outwardly from said mid portion of said motion transmitting member adjacent said outer end portion thereof and said other end of said elongated flexible member being sealingly affixed to said flange means.

4. The invention recited in claim 1 wherein said flexible sealing member comprises a flexible sandwich surrounding said mid portion, said flexible sandwich being composed of alternating rigid and flexible rings bonded together to form a fluid-tight unit.

5. The invention as recited in claim 4 wherein said flexible rings are elastomeric and said flexible member has a truncated conical form the small end of which is sealed to said motion transmitting member and the larger end of which is sealed about said opening in said wall.

* * * * *